(12) United States Patent
Pursifull

(10) Patent No.: US 10,161,351 B2
(45) Date of Patent: Dec. 25, 2018

(54) GASEOUS FUEL SYSTEM AND METHOD FOR AN ENGINE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1199 days.

(21) Appl. No.: 13/682,514

(22) Filed: Nov. 20, 2012

(65) Prior Publication Data
US 2014/0142832 A1 May 22, 2014

(51) Int. Cl.
| | |
|---|---|
| *F02D 41/22* | (2006.01) |
| *F02D 45/00* | (2006.01) |
| *F02D 41/00* | (2006.01) |
| *F02D 41/04* | (2006.01) |

(52) U.S. Cl.
CPC ......... *F02D 45/00* (2013.01); *F02D 41/0027* (2013.01); *F02D 41/22* (2013.01); *F02D 41/042* (2013.01); *F02D 2041/225* (2013.01); *F02D 2200/0602* (2013.01); *F02D 2200/0606* (2013.01); *Y02T 10/40* (2013.01)

(58) Field of Classification Search
CPC ...... F02D 45/00; F02D 41/22; F02D 41/0027; F02D 2200/0602; F02D 2200/0606; F02D 41/042; F02D 2041/225; Y02T 10/40
See application file for complete search history.

(56) References Cited

U.S. PATENT DOCUMENTS

| | | | |
|---|---|---|---|
| 5,964,204 A | 10/1999 | Freeland | |
| 6,321,727 B1 | 11/2001 | Reddy et al. | |
| 6,401,528 B1 | 6/2002 | Lambert et al. | |
| 6,467,466 B1 * | 10/2002 | Maekawa | F02D 41/0027 123/198 D |
| 6,492,043 B1 * | 12/2002 | Knights | H01M 8/04029 429/446 |
| 6,539,927 B2 * | 4/2003 | Fabre | F02M 25/0809 123/520 |

(Continued)

FOREIGN PATENT DOCUMENTS

CN 101566100 A 10/2009

OTHER PUBLICATIONS

Anonymous, "Inflator Tank Test Continuous Limit Envelope Incorporating Time and Pressure Shifts," IPCOM No. 000152563, Published May 7, 2007, 3 pages.

(Continued)

*Primary Examiner* — David Hamaoui
(74) *Attorney, Agent, or Firm* — Julia Voutyras; McCoy Russell LLP

(57) ABSTRACT

A vehicle method for gaseous fuel loss detection, including for each of a high and low pressure portion of a fuel system including a gaseous fuel, indicating degradation based on a loss of mass from the fuel system, the loss of mass based on separately tracking fuel mass in each of the portions based on respective temperatures and pressures at a first and second instance following an engine off condition. The method may utilize the respective pressures and temperatures to determine which portions of the fuel system are losing mass and further identify degradation of fuel system valves.

13 Claims, 4 Drawing Sheets

(56) References Cited

U.S. PATENT DOCUMENTS

| | | | | |
|---|---|---|---|---|
| 6,910,468 | B2* | 6/2005 | Yamaoka | F02M 37/20 |
| | | | | 123/527 |
| 7,137,294 | B2* | 11/2006 | Eser | F02D 41/221 |
| | | | | 73/114.51 |
| 7,322,345 | B2* | 1/2008 | Saito | F02D 41/221 |
| | | | | 123/529 |
| 7,703,435 | B2* | 4/2010 | Surnilla | F02D 19/0628 |
| | | | | 123/27 GE |
| 7,762,234 | B2* | 7/2010 | Ulrey | F02B 1/12 |
| | | | | 123/198 D |
| 8,155,917 | B2* | 4/2012 | Maegawa | F02M 25/0818 |
| | | | | 702/140 |
| 8,967,123 | B2* | 3/2015 | Saito | F02D 19/0681 |
| | | | | 123/525 |
| 9,133,783 | B2* | 9/2015 | Slaymaker | F02D 41/065 |
| 9,222,431 | B2* | 12/2015 | Rosel | F02D 41/06 |
| 9,284,895 | B2* | 3/2016 | Naidu | F02D 19/021 |
| 2007/0040053 | A1* | 2/2007 | Date | F02M 61/1846 |
| | | | | 239/533.2 |
| 2010/0251763 | A1 | 10/2010 | Audun | |
| 2013/0255636 | A1* | 10/2013 | Pursifull | F02M 47/00 |
| | | | | 123/446 |

OTHER PUBLICATIONS

Partial Translation of Office Action of Chinese Patent Application No. 201310581393.5, dated Feb. 6, 2017, State Intellectual Property Office of PRC, 8 pages.

\* cited by examiner

GASEOUS FUEL SYSTEM AND METHOD FOR AN ENGINE

BACKGROUND AND SUMMARY

Engines may operate on gaseous fuel, such as natural gas. Both liquid natural gas (LNG) and gaseous, compressed natural gas (CNG) are being used as automotive applications. For CNG, the gas may be compressed and stored in cylinders under high pressure, utilizing a pressure regulating valve to supply the fuel to the engine combustion chamber at a lowered pressure. CNG fuels may be used with various engine systems, including mono-fuel systems that utilize CNG as the sole fuel source, and multi-fuel systems configured to utilize CNG alongside one or more additional fuels, including liquid fuels such as gasoline, diesel, or gasoline-ethanol blends.

Liquid fuel systems are subject to requirements regarding the prevention and detection of fuel vapor loss. This is referred to as evaporative emissions controls. While these systems have been extensively developed for mixed phase (liquid and vapor) fuels, they have not been developed for gaseous fuels such as CNG.

Evaporative emissions may be broadly divided into three classes: 1) fuel vapor loss during refueling, 2) running loss or fuel loss during key-on conditions, and 3) diurnal loss, or fuel loss during key-off conditions. This invention is concerned with fuel loss while the gaseous fuel is not in use, either during key-off conditions or under key-on conditions where the gaseous fuel is not in use, such as a multi-fuel system running on another fuel (e.g. gasoline) or a hybrid system running in an electric-only mode.

The inventors herein have recognized several unique challenges specific to emission testing and leak detection for natural gas vehicles (NGVs). For example, the tests may be most accurate when the system temperatures and pressures are at steady-state equilibrium. There may be a variety of tanks or chambers where gas is trapped at a variety of pressures. Thus, neither the optimal timing for testing nor the optimal locations within the system for taking measurements are obvious for gaseous fuel systems.

In one example, the above issues may be addressed by a method, comprising: for each of a high and low pressure portion of a fuel system including a gaseous fuel, indicating degradation based on a loss of mass from the fuel system, the loss of mass based on separately tracking fuel mass in each of the portions based on respective temperatures and pressures at a first and second time instance following an engine off condition. The system may be adjusted in various ways responsive to the degradation indication, including setting a diagnostic code, displaying a message to a vehicle operator, and/or limiting engine output and/or fuel delivery to the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF FIGURES

Figure 1:
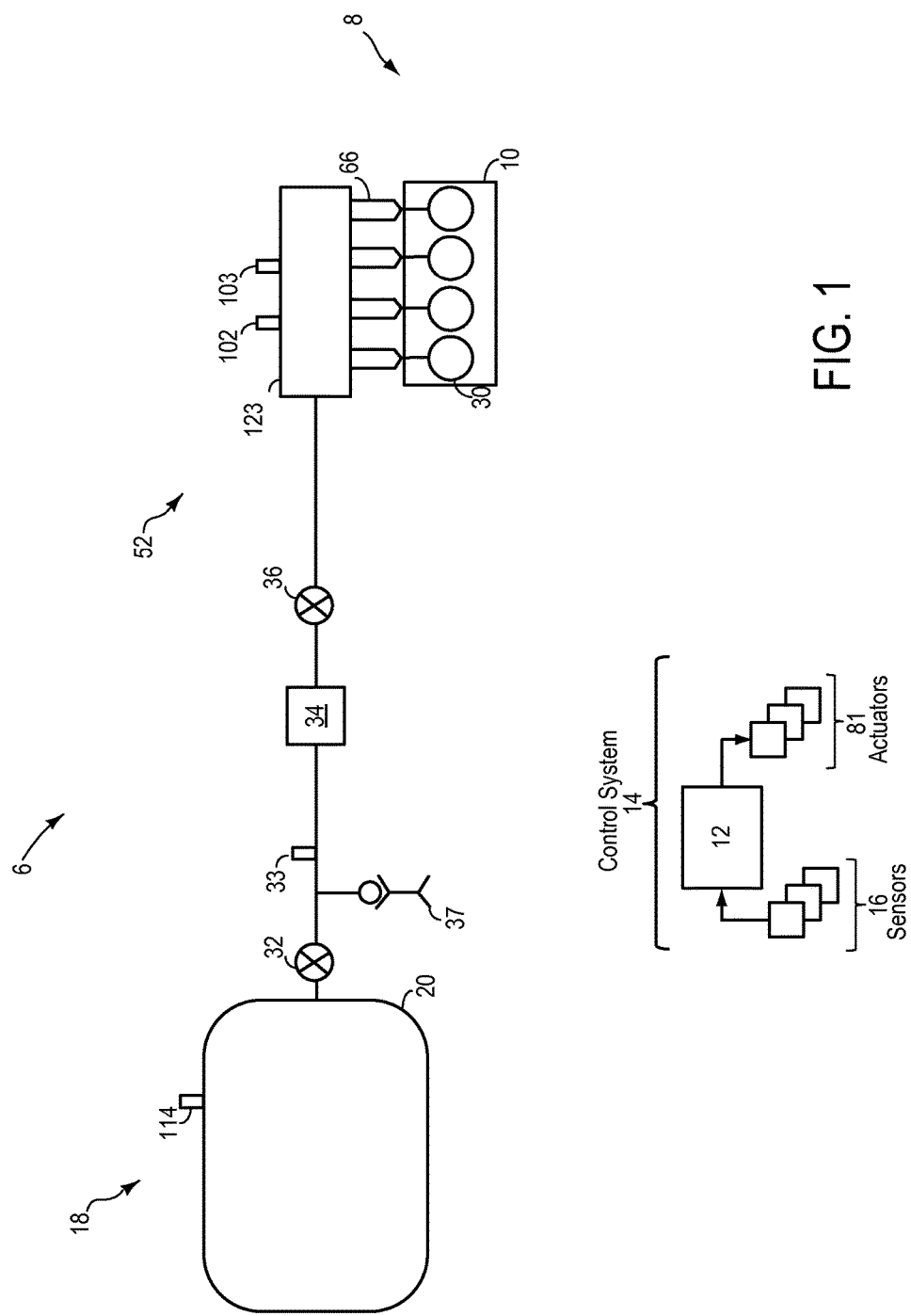
FIG. 1 is a schematic diagram of an exemplary embodiment of an engine system and fuel system of the present disclosure.
Figure 2:
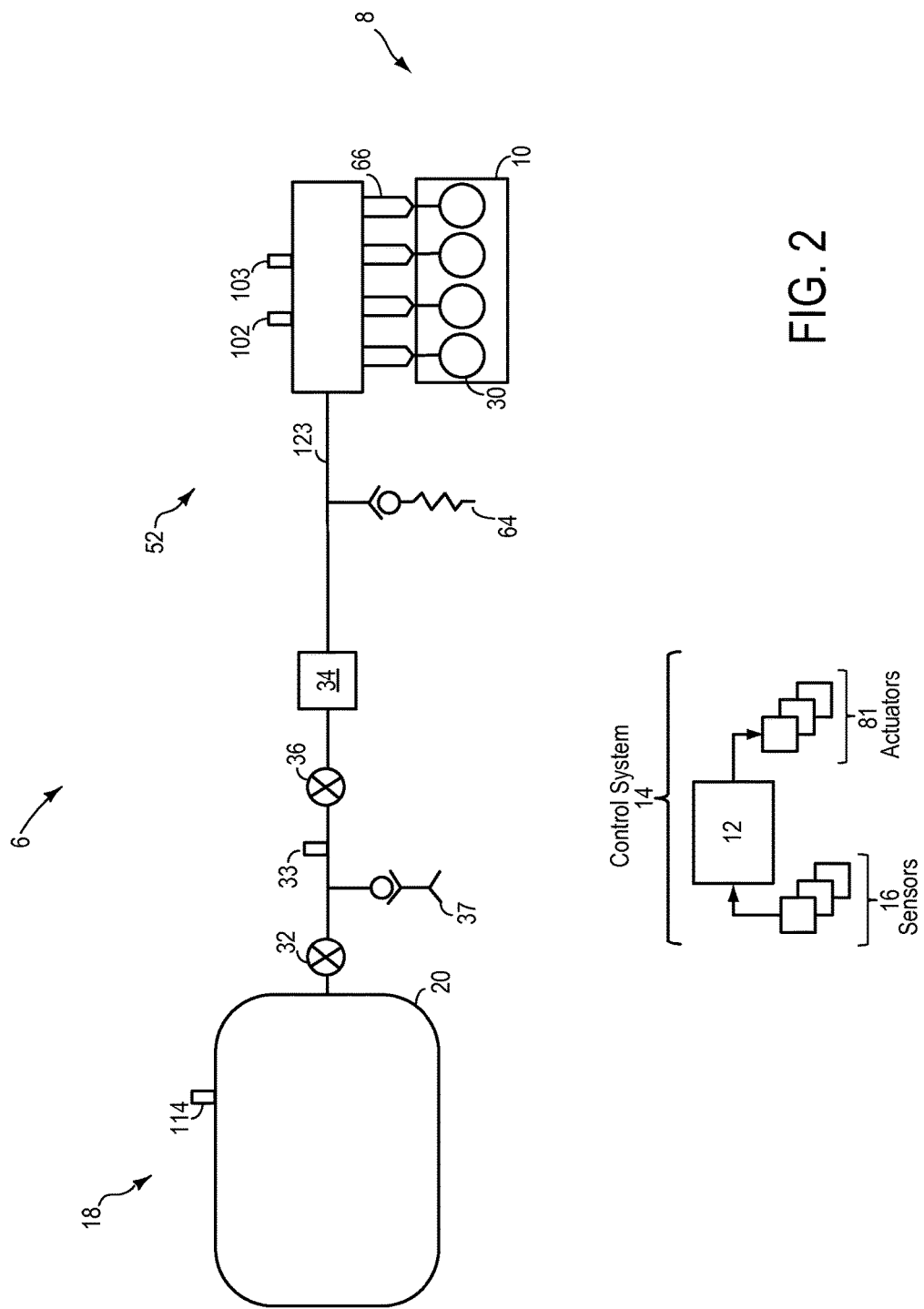
FIG. 2 is a schematic diagram of a second exemplary embodiment of an engine system and fuel system for a vehicle of the present disclosure.

FIGS. 1 and 2 show schematic depictions of a vehicle system 6. The vehicle system 6 includes an engine system 8, a control system 14, and a fuel system 18. The engine system 8 may include an engine 10 having a plurality of cylinders 30. The engine 10 may include an engine intake and an engine exhaust. The engine intake may includes a throttle fluidly coupled to an engine intake manifold via an intake passage. The engine exhaust may include an exhaust manifold leading to an exhaust passage that routes exhaust gas to the atmosphere upon passage through an emission control device. It will be appreciated that other components may be included in the engine such as a variety of valves and sensors.

Fuel system 18 may include one or more fuel tanks. In the depicted example, the fuel system is a single-fuel system including a fuel tank 20 configured to deliver a first fuel having a first chemical and physical property along a first fuel line 52. Fuel system 18 may further include a second fuel tank configured to deliver a second fuel having a second, different chemical and physical property along a second fuel line. Various fuel system components, such as various valves, pressure regulators, filters, and sensors, may be coupled along fuel line 52. Fuel tank 20 may hold a plurality of fuel or fuel blends. For example, the fuel may be a gaseous fuel, such as compressed natural gas (CNG) or liquefied petroleum gas (LPS). In the example of a second fuel tank, the second fuel may be a liquid fuel, such as gasoline, fuel with a range of alcohol concentrations, various gasoline-ethanol fuel blends (e.g., E10, E85), and combinations thereof.

The fuel stored in fuel tank 20 may be delivered to an injector 66 of engine cylinder 30 via a fuel rail 123. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector. The fuel system may further include one or more valves to regulate the supply of fuel from fuel tank 20 to the injector 66.

Direct injection provides multiple advantages during high load conditions. For example, introducing oxygenated, liquid fuels with direct injection and high heat of vaporization at high load provides charge cooling for increased air charge, dilution for combustion temperature control, and knock resistance. On the other hand, port injection may provide advantages during low load conditions. For example, introducing high volatility fuels by intake injection at low load may provide enhanced startability, particulate emission reduction, and less unvaporized fuel. By utilizing either direct or port injection over various areas of the speed-load map, the benefits provided by both systems may be maximized.

In the depicted examples, fuel line 52, and related components, may be configured to deliver a gaseous fuel to the engine cylinders. Accordingly, fuel tank 20 may be coupled to a pressure regulator 34 and a solenoid valve 36 to enable a fixed low pressure supply of the fuel to be provided to injector 66. A tank valve 32 (e.g., a check valve) may be positioned between fuel tank 20 and pressure regulator 34 to ensure correct flow of fuel from the fuel tank. A tank output line pressure sensor 33 may be positioned upstream of pressure regulator 34 and downstream of fuel tank 20 to provide an estimate of fuel pressure before pressure regulation by the pressure regulator 34. That is, pressure sensor 33 may provide an estimate of fuel pressure input on the higher pressure side of pressure regulator 34. A fill port 37 may be positioned upstream of the tank valve 32 and downstream of the pressure regulator 34 to allow for refueling. Solenoid valve 36 also referred to as a lock-off valve or a line valve may be coupled between pressure regulator 34 and fuel rail 123. In another example, as shown in FIG. 2, pressure regulator 34 may be coupled between solenoid valve 36 and fuel rail 123. A pressure relief valve 64 may be coupled to fuel line 52 downstream of pressure regulator 34.

In one example, fuel tank 20 may store the gaseous fuel in a pressure range of 10-700 bar (e.g., 0-100+ psi for LNG fuel, 500 psi for ANG fuel, 3000-6000 psi for CNG fuel, and 5000-10,000 psi for hydrogen fuel) while pressure regulator 34 may regulate the fuel rail pressure to a fixed range of 10-40 bar (e.g., 2-10 bar for CNG fuel). A further check valve (not shown) may be coupled downstream of pressure regulator 34 and upstream of fuel injector 66. As such fuel system 18 may be a return-less fuel system, a return fuel system, or various other types of fuel system. It will be appreciated that while the embodiment shows fuel system 18 as a single-fuel system, in alternate embodiments, fuel system 18 may be a multi-fuel system wherein engine 10 is configured to operate on with liquid fuel from an additional fuel tank.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include MAP and MAF sensors in the intake, exhaust gas sensor and temperature sensor located in the exhaust, pressure sensor 102 coupled to fuel rail 123 and configured to provide an estimate of the fuel rail pressure, temperature sensor 103 coupled to fuel rail 123 and configured to provide an estimate of the fuel rail temperature, temperature sensor 114 coupled to fuel tank 20 and configured to provide an estimate of the fuel tank temperatures, etc. Other sensors such as pressure, temperature, fuel level, air/fuel ratio, and composition sensors may be coupled to various locations in the vehicle system 6. As another example, the actuators may include fuel pump 21, fuel injector 66, solenoid valve 36, pressure regulator 34, throttle 62, tank valve 32, and pressure relief valve 64. The control system 14 may include a controller 12. The controller may receive input data from the various sensors, process the input data, and trigger the actuators in response to the processed input data based on instruction or code programmed therein corresponding to one or more routines. Example routines are shown in FIGS. 3-4.

Figure 3:
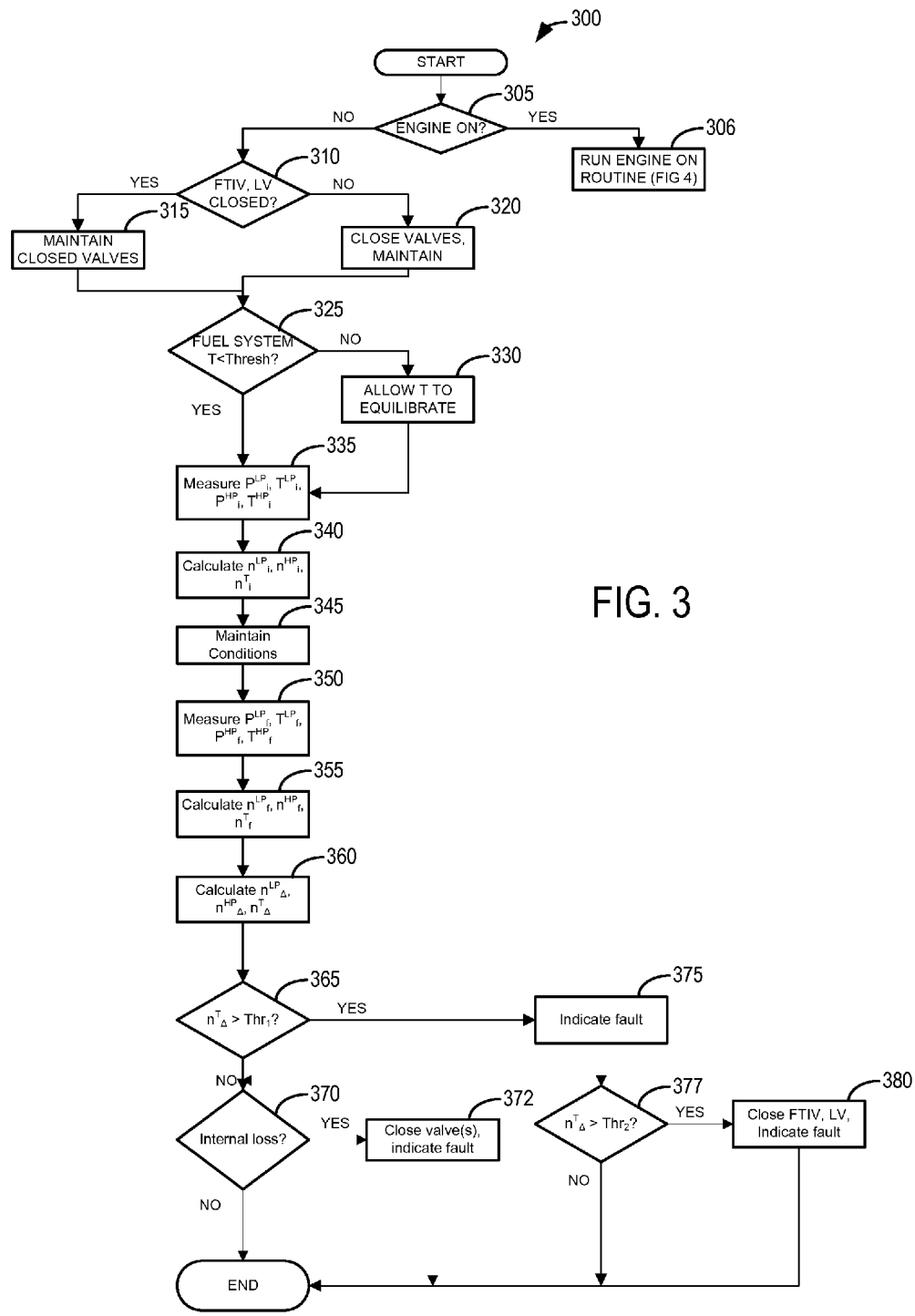
FIG. 3 shows an example flowchart for determining a mass of gaseous fuel lost from a fuel system and high and low pressure portions thereof between a first and second time points based on fuel line pressures and fuel line temperatures of fuels in the fuel system at said time points.
Figure 4:
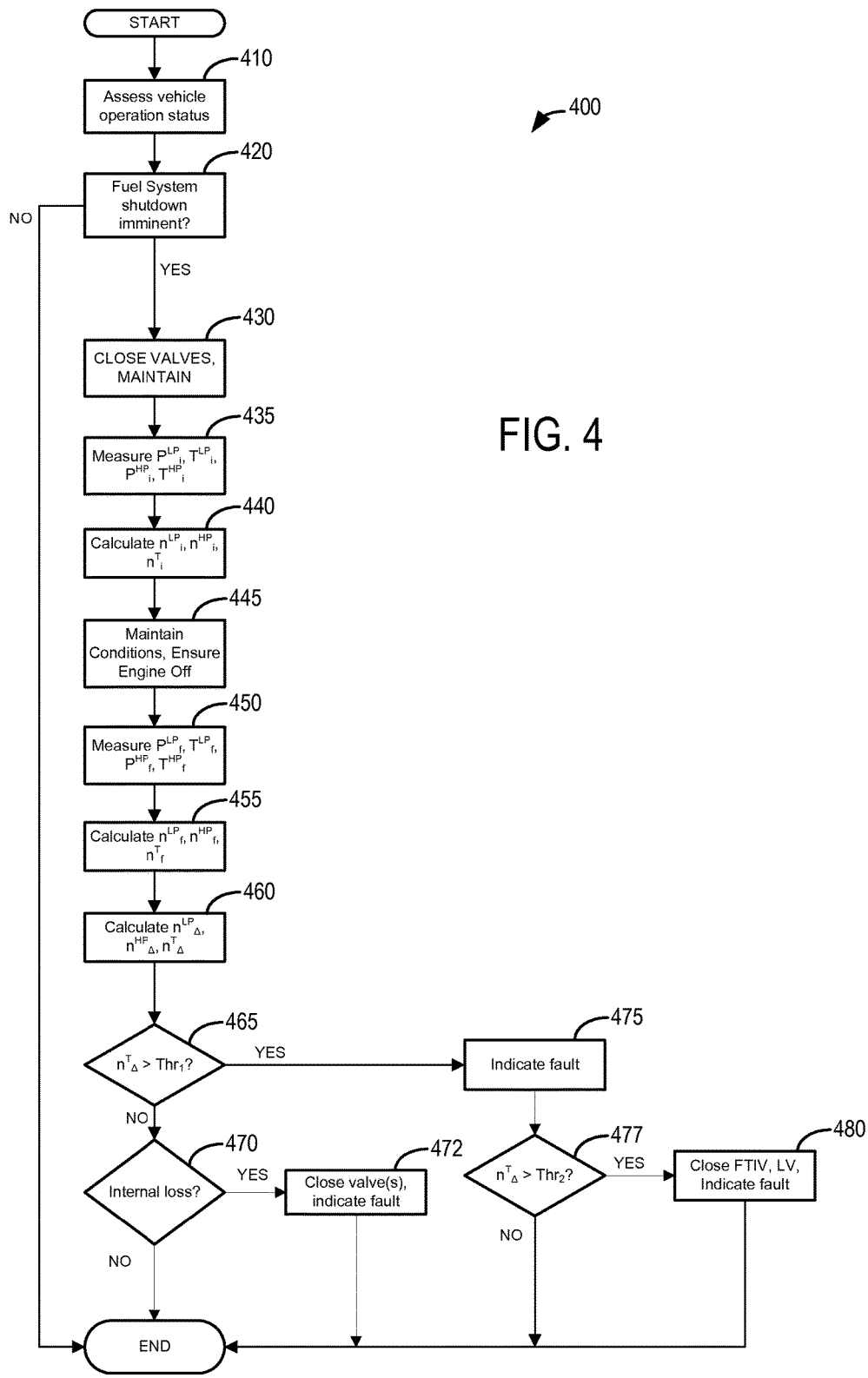
FIG. 4 shows a second example flowchart for determining a mass of gaseous fuel lost from a fuel system and high and low pressure portions thereof between a first and second time points based on fuel line pressures and fuel line temperatures of fuels in the fuel system at said time points.

FIG. 3 illustrates an example routine 300 for an emissions test for a vehicle with a gaseous fuel tank. Routine 300 may be performed repeatedly as a means to quantify fuel mass loss. In one example, routine 300 may be run over a period of 24 or more hours after engine shut off to quantify evaporative emissions over a diurnal cycle.

Routine 300 may begin at 305, where controller 12 may assess whether or not engine 10 is on, for example, carrying out combustion. If the engine is on, routine 300 may proceed to 306, where an engine-on subroutine may be run to diagnose leaks or emissions. Example subroutines are described further in FIG. 4. In another example, routine 300 may end or otherwise pause until the engine is turned off.

If the engine has been turned off (e.g., is at rest with combustion discontinued), routine 300 may proceed to 310, where controller 12 may assess whether FTIV 32 and LV 36 are closed. If either or both of said valves are not closed, routine 300 may proceed to 320, where controller 12 may close the FTIV and LV, and maintain the closed state of said valves for the duration of routine 300. If the FTIV and LV are determined to be closed at 310, routine 300 move to 315 and maintain the closed state of said valves for the duration or routine 300. In another example, if another routine overrides routine 300 and causes the FTIV or LV to be opened, routine 300 may end.

When both FTIV 32 and LV 36 are closed and maintained closed, routine 300 may proceed to 325, where controller 325 may assess whether the fuel system temperature is below a predetermined threshold, as determined by temperature sensors 103, 114 or other on-board temperature sensors. Routine 300 may provide the most accurate results in situations where the temperature of the engine and fuel system have decreased below a threshold that is significantly below the operating temperature of the engine and fuel system when the engine is on. If the fuel system temperature is determined to be below said threshold and steady (e.g., not changing by more than 10% over a threshold time, for example, 1 hour), routine 300 may proceed to 335. If the fuel system temperature is determined to be above said threshold, routine 300 may proceed to 330. This may occur in a scenario when the engine has been recently turned off. At 330, controller 12 may allow the temperature to equilibrate to a value below a predetermined threshold by maintaining engine-off conditions for a predetermined period of time after engine shut-off. In on example, the period of time may be three hours. In another example, the controller 12 may repeatedly read the temperature of the fuel system as assessed by temperature sensors 103, 114 or other on-board temperature sensors until the temperature has equilibrated or decreased to a value below said threshold value. When the fuel system temperature has reached said threshold value or the predetermined time period after engine shutoff has elapsed, routine 300 may proceed to 335.

At 335, controller 12 may read the temperature and pressure of the gaseous fuel in a high pressure portion of fuel line 52 or another portion of fuel system 18 upstream of regulator 34 and the temperature and pressure of the gaseous fuel in a low pressure portion of the fuel line 52 or another portion of fuel system 18 downstream of regulator 34. The time of the reading may be assigned as a first or initial time point. The pressure of the low pressure portion at the initial time point may be assessed by pressure sensor 102 or another on-board sensor and read by controller 12, which may designate this value as $P^{LP}_i$. The temperature of the low pressure portion at the initial time point may be assessed by temperature sensor 103 or another on-board sensor and read by controller 12, which may designate this value as $T^{LP}_i$. In some examples, the temperature and pressure of the low pressure portion of the fuel system are estimated by a first pressure sensor and first temperature sensor coupled between the pressure regulator and a fuel injector. The pressure of the high pressure portion at the initial time point may be assessed by pressure sensor 33 or another on-board sensor and read by controller 12, which may designate this value as $P^{HP}_i$. The temperature of the high pressure portion at the initial time point may be assessed by temperature sensor 114 or another on-board sensor and read by controller 12, which may designate this value as $T^{HP}_i$. In one example, the temperature and pressure of the high pressure portion of the fuel system are estimated by a second pressure sensor and second temperature sensor coupled between the pressure regulator and the fuel tank. When said measurements have been taken and said values have been assigned, routine 300 may move to 340. In another example, controller 12 may also read the temperature and pressure of the gaseous fuel in the fuel tank as assessed by fuel tank pressure and temperature sensors. Controller 12 may designate the value of fuel tank pressure taken at the initial time point as $P^{TANK}_i$ and may designate the value of the fuel tank temperature taken at the initial time point as $T^{TANK}_i$.

At 340 controller 12 may take the pressure and temperature measurements taken at the initial time point and use them to calculate the molar quantity of included fuel in the high and low pressure portions at said time point, taking into account the volume of the fuel system portions (which may be designated $V^{HP}$ and $V^{LP}$ respectively) and the gas constant R. The molar quantity of included gaseous fuel in the low pressure portion may be designated as $n^{LP}_i$ and determined by the equation $n^{LP}_i = P^{LP}_i V^{LP}/RT^{LP}_i$. The molar quantity of included gaseous fuel in the high pressure portion may be designated as $n^{HP}_i$ and determined by the equation $n^{HP}_i = P^{HP}_i V^{HP}/RT^{HP}_i$. The total molar quantity of included gaseous fuel in the high and low pressure portions may be designated as $n^T_i$ and determined by the equation $n^T_i = n^{LP}_i + n^{HP}_i$.

In the example where controller 12 has read the temperature and pressure of the gaseous fuel in the fuel tank, the controller may calculate a molar quantity of included gaseous fuel in the fuel tank. The molar quantity of included gaseous fuel in fuel tank may be designated as $n^{LP}$ and determined by the equation $n^{TANK}_i = P^{TANK}_i V^{TANK}/RT^{TANK}_i$. The total molar quantity of included gaseous fuel in the fuel system may be designated as $n^T_i$ and thus determined by the equation $n^T_i = n^{LP}_i + n^{HP}_i + n^{TANK}_i$. When controller 12 has completed the set of calculations at the initial time point, routine 300 may move to 345.

At 345, controller 12 may maintain the closed state of FTIV and LV 36 and maintain the engine-off status of the vehicle for a predetermined duration of time. In one example, this duration may be for 24 hours or longer as needed to complete a diurnal emissions test as required by state or local laws. When the predetermined duration has passed, and the valves have remained sealed without becoming unsealed, and the engine has remained off without turning on, routine 300 may proceed to 350.

At 350, controller 12 may read the temperature and pressure of the gaseous fuel in a high pressure portion of fuel line 52 or another portion of fuel system 18 upstream of regulator 34 and the temperature and pressure of the gaseous fuel in a low pressure portion of the fuel line 52 or another portion of fuel system 18 downstream of regulator 34. The time of the reading may be assigned as a second or final time point. The pressure of the low pressure portion at the final time point may be assessed by pressure sensor 102 or another on-board sensor and read by controller 12, which may designate this value as $P^{LP}_f$. The temperature of the low pressure portion at the final time point may be assessed by temperature sensor 103 or another on-board sensor and read by controller 12, which may designate this value as $T^{LP}_f$. The pressure of the high pressure portion at the final time point may be assessed by pressure sensor 33 or another on-board sensor and read by controller 12, which may designate this value as $P^{HP}_f$. The temperature of the high pressure portion at the final time point may be assessed by temperature sensor 114 or another on-board sensor and read by controller 12, which may designate this value as $T^{HP}_f$. When said measurements have been taken and said values have been assigned, routine 300 may move to 355. In another example, controller 12 may also read the temperature and pressure of the gaseous fuel in the fuel tank as assessed by fuel tank pressure and temperature sensors. Controller 12 may designate the value of fuel tank pressure taken at the final time point as $P^{TANK}_f$ and may designate the value of the fuel tank temperature taken at the initial time point as $T^{TANK}_f$.

At 355 controller 12 may take the pressure and temperature measurements taken at the final time point and use them to calculate the molar quantity of included fuel in the high and low pressure portions at said time point, taking into account the volume of the fuel system portions (which may be designated $V^{HP}$ and $V^{LP}$ respectively) and the gas constant R. The molar quantity of included gaseous fuel in the low pressure portion may be designated as $n^{LP}_f$ and determined by the equation $n^{LP}_f = P^{LP}_f V^{LP}/RT^{LP}_f$. The molar quantity of included gaseous fuel in the high pressure portion may be designated as $n^{HP}_f$ and determined by the equation $n^{HP}_f = P^{HP}_f V^{HP}/RT^{HP}_f$. The total molar quantity of included gaseous fuel in the high and low pressure portions may be designated as $n^T_f$ and determined by the equation $n^T_f = n^{LP}_f + n^{HP}_f$.

In the example where controller 12 has read the temperature and pressure of the gaseous fuel in the fuel tank, the controller may calculate a molar quantity of included gaseous fuel in the fuel tank. The molar quantity of included gaseous fuel in fuel tank may be designated as $n^{TANK}_f$ and determined by the equation $n^{TANK}_f = P^{TANK}_f V^{TANK}/RT^{TANK}_f$. The total molar quantity of included gaseous fuel in the fuel system may be designated as $n^T_f$ and thus determined by the equation $n^T_f = n^{LP}_f + n^{HP}_f + n^{TANK}_f$. When controller 12 has completed the set of calculations at the initial time point, routine 300 may move to 360.

At 360, controller 12 may use the initial and final molar quantities of included gaseous fuel to determine if there has been any mass flow between portions of the fuel system or mass loss from the fuel system. The change in molar quantity of included gaseous fuel in the low pressure portion may be designated as $n^{LP}_\Delta$ and determined by the equation $n^{LP}_\Delta = n^{LP}_i - n^{LP}_f$. The change in molar quantity of included gaseous fuel in the high pressure portion may be designated as $n^{HP}_\Delta$ and determined by the equation $n^{HP}_\Delta = n^{HP}_i - n^{HP}_f$. The change in total molar quantity of included gaseous fuel in the high and low pressure portion may be designated as $n^T_\Delta$ and determined by the equation $n^T_\Delta = n^T_i - n^T_f$. A positive $n_\Delta$ value indicates a leak out of the system or portion of the system. A negative $n_\Delta$ value indicates a leak into the system or portion of the system.

In the example where controller 12 has calculated initial and final molar quantities of included gaseous fuel in the fuel tank, the controller may use said quantities to calculate the change in molar quantity in said fuel tank. The change in molar quantity of included gaseous fuel in the low pressure portion may be designated as n and determined by the equation $n^{TANK}_\Delta = n^{TANK}_i - n^{TANK}_f$. Routine 300 may then move to 365.

At 365, controller 12 may compare $n^T_\Delta$ to a first threshold (Thr$_1$). In one example, Thr$_1$ may be set at the limit for a minor diurnal leak. If $n^T_\Delta$ is greater than Thr$_1$, routine 300 may move to 375. At 375, controller 12 may indicate that a minor diurnal leak has been detected. In one example, a malfunction indicator light may be illuminated, alerting the operator to service the vehicle. Next routine 300 may move to 377, where controller 12 may compare $n^T_\Delta$ to a second threshold (Thr$_2$). In one example, Thr$_2$ may be set at the limit for a gross diurnal leak. If $n^T_\Delta$ is less than Thr$_2$, routine 300 may end. If $n^T_\Delta$ is greater than Thr$_2$ routine 300 may move to 380. At 380, controller 12 may indicate that a gross diurnal leak has been detected. In one example, a malfunction indicator light may be illuminated, alerting the operator to service the vehicle. Controller 12 may also close FTIV 32 and LV 36. Routine 300 may then end. In another example, an indication of a gross diurnal leak may cause controller 12 to limit vehicle operation until the vehicle is serviced.

Returning to 365, if $n^T_\Delta$ is less than Thr$_1$, controller 12 may move to 370. At 370, controller 12 may determine if there is an internal leak between the high and low pressure portions of the fuel line, or between the fuel tank and the high pressure portion. In one example, $n^T_\Delta = 0$, but $n^{LP}_\Delta$ is approximately equal to $-n^{HP}_\Delta$. This may indicate a leak from the high pressure portion of the fuel line to the low pressure portion of the fuel line through the regulator or line valve. In another example, $n^T_\Delta = 0$, but $n^{HP}_\Delta$ is approximately equal to $-n^{TANK}_\Delta$. This may indicate a leak from the fuel tank to the high pressure portion of the fuel line through the fuel tank isolation valve. If an internal leak is indicated, routine 300 may move to 372. If no internal leak is indicated, routine 300 may end. If routine 300 moves to 372, controller 12 may close the implicated valves and indicate a fault. Routine 300 may then end.

In another example, the initial time point and corresponding pressure and temperature measurements may occur when the vehicle is running or has recently shut down. FIG. 4 illustrates an example routine 400 for an emissions test for a vehicle with a gaseous fuel tank. Routine 400 may be performed repeatedly as a means to quantify fuel mass loss. In one example, routine 400 may be run over a period of 24 or more hours after engine shut off to quantify evaporative emissions over a diurnal cycle. Routine 400 may be run as a subroutine of routine 300 or as an independent routine.

Routine 400 may begin at 410, where controller 12 may read the operating conditions of the vehicle, engine and/or fuel system as assessed by on board sensors. Next, at 420 controller 12 may use the operating conditions to determine whether a fuel system shut-off is imminent. In order for routine 400 to run to completion, the FTIV 32 and LV 36 will need to be closed. At 420, controller 12 may ensure that closing said valves will not interfere with vehicle operation. In one example, the vehicle may have been shut off, but the vehicle temperature has not equilibrated below the threshold necessary to run routine 300. In another example, the vehicle may be stationary and placed into a parking mode. In another example, the vehicle may be a hybrid vehicle and running in an engine-off mode or transitioning into a motor-only mode. In another example, the vehicle may have multiple fuel tanks, and utilizing a second fuel tank or transitioning to a second fuel tank only mode.

If a fuel system shut-off is not imminent, routine 400 may end. If controller 12 determines that a fuel system shut-off is imminent, and vehicle operation will not be impacted by closing FTIV 32 or line valve 36, routine 400 may proceed to 430. At 430, controller 12 may close FTIV 32 and LV 36 and may maintain the closed status of said valves for the duration of routine 400. Routine 400 may then proceed to 435.

At 435, controller 12 may read the temperature and pressure of the gaseous fuel in a high pressure portion of fuel line 52 or another portion of fuel system 18 upstream of regulator 34 and the temperature and pressure of the gaseous fuel in a low pressure portion of the fuel line 52 or another portion of fuel system 18 downstream of regulator 34. The time of the reading may be assigned as a first or initial time point. The pressure of the low pressure portion at the initial time point may be assessed by pressure sensor 102 or another on-board sensor and read by controller 12, which may designate this value as $P^{LP}_i$. The temperature of the low pressure portion at the initial time point may be assessed by temperature sensor 103 or another on-board sensor and read by controller 12, which may designate this value as $T^{LP}_i$. The pressure of the high pressure portion at the initial time point may be assessed by pressure sensor 33 or another on-board sensor and read by controller 12, which may designate this value as $P^{HP}_i$. The temperature of the high pressure portion at the initial time point may be assessed by temperature sensor 114 or another on-board sensor and read by controller 12, which may designate this value as $T^{HP}_i$. When said measurements have been taken and said values have been assigned, routine 400 may move to 440. In another example, controller 12 may also read the temperature and pressure of the gaseous fuel in the fuel tank as assessed by fuel tank pressure and temperature sensors. Controller 12 may designate the value of fuel tank pressure taken at the initial time point as $P^{TANK}_i$ and may designate the value of the fuel tank temperature taken at the initial time point as $T^{TANK}_i$.

At 440 controller 12 may take the pressure and temperature measurements taken at the initial time point and use them to calculate the molar quantity of included fuel in the high and low pressure portions at said time point, taking into account the volume of the fuel system portions (which may be designated $V^{HP}$ and $V^{LP}$ respectively) and the gas constant R. The molar quantity of included gaseous fuel in the low pressure portion may be designated as $n^{LP}_i$ and determined by the equation $n^{LP}_i = P^{LP}_i V^{LP}/RT^{LP}_i$. The molar quantity of included gaseous fuel in the high pressure portion may be designated as $n^{HP}_i$ and determined by the equation $n^{HP}_i = P^{HP}_i V^{HP}/RT^{HP}_i$. The total molar quantity of included gaseous fuel in the high and low pressure portions may be designated as $n^T_i$ and determined by the equation $n^T_i = n^{LP}_i + n^{HP}_i$.

In the example where controller 12 has read the temperature and pressure of the gaseous fuel in the fuel tank, the controller may calculate a molar quantity of included gaseous fuel in the fuel tank. The molar quantity of included gaseous fuel in fuel tank may be designated as $n^{LP}_i$ and determined by the equation $n^{TANK}_i = P^{TANK}_i V^{TANK}/RT^{TANK}_i$. The total molar quantity of included gaseous fuel in the fuel system may be designated as $n^T_i$ and thus determined by the equation $n^T_i = n^{LP}_i + n^{HP}_i + n^{TANK}_i$. When controller 12 has completed the set of calculations at the initial time point, routine 400 may move to 445.

At 445, controller 12 may maintain the closed state of FTIV and LV 36. In the scenario in which the engine was running at the initial time point, the controller may wait for a signal indicating the engine has been shut off, or the controller may indicate that a shut-off routine should occur. When the engine has been shut down, or in the scenario in which the engine was off at the initial time point, the controller may maintain the engine-off status of the vehicle for a predetermined duration of time. In one example, this duration may be for 24 hours or longer as needed to complete a diurnal emissions test as required by state or local laws. When the predetermined duration has passed, and the valves have remained sealed without becoming unsealed, and the engine has remained off without turning on, routine 400 may proceed to 450.

At 450, controller 12 may read the temperature and pressure of the gaseous fuel in a high pressure portion of fuel line 52 or another portion of fuel system 18 upstream of regulator 34 and the temperature and pressure of the gaseous fuel in a low pressure portion of the fuel line 52 or another portion of fuel system 18 downstream of regulator 34. The time of the reading may be assigned as a second or final time point. The pressure of the low pressure portion at the final time point may be assessed by pressure sensor 102 or another on-board sensor and read by controller 12, which may designate this value as $P^{LP}_f$. The temperature of the low pressure portion at the final time point may be assessed by temperature sensor 103 or another on-board sensor and read by controller 12, which may designate this value as $T^{LP}_f$. The pressure of the high pressure portion at the final time point may be assessed by pressure sensor 33 or another on-board sensor and read by controller 12, which may designate this value as $P^{HP}_f$. The temperature of the high pressure portion at the final time point may be assessed by temperature sensor 114 or another on-board sensor and read by controller 12, which may designate this value as $T^{HP}_f$. When said measurements have been taken and said values have been assigned, routine 400 may move to 455. In another example, controller 12 may also read the temperature and pressure of the gaseous fuel in the fuel tank as assessed by fuel tank pressure and temperature sensors. Controller 12 may designate the value of fuel tank pressure taken at the final time point as $P^{TANK}_f$ and may designate the value of the fuel tank temperature taken at the initial time point as $T^{TANK}_f$.

At 455 controller 12 may take the pressure and temperature measurements taken at the final time point and use them to calculate the molar quantity of included fuel in the high and low pressure portions at said time point, taking into account the volume of the fuel system portions (which may be designated $V^{HP}$ and $V^{LP}$ respectively) and the gas constant R. The molar quantity of included gaseous fuel in the low pressure portion may be designated as $n^{LP}_f$ and determined by the equation $n^{LP}_f = P^{LP}_f V^{LP}/RT^{LP}_f$. The molar quantity of included gaseous fuel in the high pressure portion may be designated as $n^{HP}_f$ and determined by the equation $n^{HP}_f = P^{HP}_f V^{HP}/RT^{HP}_f$. The total molar quantity of included gaseous fuel in the high and low pressure portions may be designated as $n^T_f$ and determined by the equation $n^T_f = n^{LP}_f + n^{HP}_f$.

In the example where controller 12 has read the temperature and pressure of the gaseous fuel in the fuel tank, the controller may calculate a molar quantity of included gaseous fuel in the fuel tank. The molar quantity of included gaseous fuel in fuel tank may be designated as $n^{TANK}_f$ and determined by the equation $n^{TANK}_f = P^{TANK}_f V^{TANK}/RT^{TANK}_f$. The total molar quantity of included gaseous fuel in the fuel system may be designated as $n^T_f$ and thus determined by the equation $n^T_f = n^{LP}_f + n^{HP}_f + n^{TANK}_f$. When controller 12 has completed the set of calculations at the initial time point, routine 400 may move to 460.

At 460, controller 12 may use the initial and final molar quantities of included gaseous fuel to determine if there has been any mass flow between portions of the fuel system or mass loss from the fuel system. The change in molar quantity of included gaseous fuel in the low pressure portion may be designated as $n^{LP}_\Delta$ and determined by the equation $n^{LP}_\Delta = n^{LP}_i - n^{LP}_f$. The change in molar quantity of included gaseous fuel in the high pressure portion may be designated as $n^{HP}_\Delta$ and determined by the equation $n^{HP}_\Delta = n^{HP}_i - n^{HP}_f$. The change in total molar quantity of included gaseous fuel in the high and low pressure portion may be designated as $n^T_\Delta$ and determined by the equation $n^T_\Delta = n^T_i - n^T_f$.

In the example where controller 12 has calculated initial and final molar quantities of included gaseous fuel in the fuel tank, the controller may use said quantities to calculate the change in molar quantity in said fuel tank. The change in molar quantity of included gaseous fuel in the low pressure portion may be designated as $n^{TANK}_\Delta$ and determined by the equation $n^{TANK}_\Delta = n^{TANK}_i - n^{TANK}_f$. Routine 400 may then move to 465.

At 465, controller 12 may compare $n^T_\Delta$ to a first threshold ($Thr_1$). In one example, $Thr_1$ may be set at the limit for a minor diurnal leak. If $n^T_\Delta$ is greater than $Thr_1$, routine 400 may move to 475. At 475, controller 12 may indicate that a minor diurnal leak has been detected. In one example, a malfunction indicator light may be illuminated, alerting the operator to service the vehicle. Next routine 400 may move to 477, where controller 12 may compare $n^T_\Delta$ to a second threshold ($Thr_2$). In one example, $Thr_2$ may be set at the limit for a gross diurnal leak. If $n^T_\Delta$ is less than $Thr_2$, routine 400 may end. If $n^T_\Delta$ is greater than $Thr_2$, routine 400 may move to 480. At 480, controller 12 may indicate that a minor diurnal leak has been detected. In one example, a malfunction indicator light may be illuminated, alerting the operator to service the vehicle. Controller 12 may also close FTIV 32 and LV 36. Routine 400 may then end. In another example, an indication of a gross diurnal leak may cause controller 12 to limit vehicle operation until the vehicle is serviced.

Returning to 465, if $n^T_\Delta$ is less than $Thr_1$, controller 12 may move to 470. At 470, controller 12 may determine if there is an internal leak between the high and low pressure portions of the fuel line, or between the fuel tank and the high pressure portion. In one example, $n^T_\Delta = 0$, but $n^{LP}_\Delta$ is approximately equal to $-n^{HP}_\Delta$. This may indicate a leak from the high pressure portion of the fuel line to the low pressure portion of the fuel line through the regulator or line valve. In another example, $n^T_\Delta = 0$, but $n^{HP}_\Delta$ is approximately equal to $-n^{TANK}_\Delta$. This may indicate a leak from the fuel tank to the high pressure portion of the fuel line through the fuel tank isolation valve. If an internal leak is indicated, routine 400 may move to 472. If no internal leak is indicated, routine 400 may end. If routine 400 moves to 472, controller 12 may close the implicated valves and indicate a fault. Routine 400 may then end.

The routines illustrated in FIGS. 3 and 4 may be used to determine evaporative emissions over a diurnal cycle and may also be used to determine the point of origin of minor or gross leaks and may also be used to determine the determine if the FTIV and LV are fully sealable. In an example where there are no leaks and both valves are fully sealable, the total mass of included gaseous fuel in the entire system ($n^T$) may not change from the first time point to the second time point ($n^T_\Delta = 0$ and/or $n^T_\Delta = 0$). $n^{LP}_\Delta$, $n^{HP}_\Delta$ and $n^{TANK}_A$ may also be approximately equal 0 in this example, as no gaseous fuel should move between the portions of the fuel system when the valves are sealed. While the routines may provide various forms for indicating degradation, the indication may further include additional information. for example, the degradation system may indicate which portion of the fuel system has lost more than a threshold amount of mass, and may indicate that the mass lost from the fuel system is lost from the high pressure portion of the fuel system and or from the low pressure portion of the fuel system depending in the determinations described in FIGS. 3-4. Note that while the above examples show calculations based on absolute equality, a difference between the parameters falling within a threshold, for example, within 5%, may be substantially equal and satisfy the condition identified.

In one example, a leak may occur within the high pressure portion of the fuel system. In this scenario, if both valves are fully sealable the total mass of included gaseous fuel in the entire system ($n^T$) may decrease from the first time point to the second time point. ($n^T_A>0$ and/or $n^T_{A'}>0$). Additionally, the total mass of included gaseous fuel in the high pressure portion ($n^{HP}$) may decrease from the first time point to the second time point ($n^{HP}_A>0$) while $n^{LP}_A$ and $n^{TANK}_A$ may be approximately equal 0 in this example, as no gaseous fuel should move between the port n of the fuel system when the valves are sealed.

In another example, a leak may occur within the low pressure portion of the fuel system. In this scenario, if both valves are fully sealable the total mass of included gaseous fuel in the entire system ($n^T$) may decrease from the first time point to the second time point. ($n^T_A>0$ and/or $n^T_{A'}>0$). Additionally, the total mass of included gaseous fuel in the low pressure portion ($n^{LP}$) may decrease from the first time point to the second time point ($n^{LP}_A>0$) while $n^{HP}_A$ and $n^{TANK}_A$ may be approximately to equal 0 in this example, as no gaseous fuel should move between the portions of the fuel system when the valves are sealed.

In another example, a leak may occur within the fuel tank. In this scenario, if both valves are fully sealable, the total mass of included gaseous fuel in the entire system ($n^T$) may decrease from the first time point to the second time point. ($n^T_A>0$). Additionally, the total mass of included gaseous fuel in the fuel tank ($n^{TANK}$) may decrease from the first time point to the and second time point ($n^{TANK}_A>0$) while $n^{HP}_A$ and $n^{LP}_A$ may be approximately to equal 0 in this example, as no gaseous fuel should move between the portions of the fuel system when the valves are sealed.

In yet another example, the FTIV may leak or otherwise not form a complete seal. If the LV is fully sealable, $n^{LP}_A$ may be approximately equal 0 in this example, as no gaseous fuel should move between the high and low pressure portions of the fuel system when the LV is sealed. $n^{TANK}_A$ may be greater than 0 in this example, indicating a leak out of the fuel tank. $n^{HP}_A$ may be less than 0 in this example, indicating a leak into the high pressure portion of the fuel system. In a system where fuel tank pressure and temperature are being recorded, $n^{TANK}_A$ may be approximately equal to $-n^{HP}_A$. Additionally, $n^T_{A'}$ may be approximately to equal 0, as no gaseous fuel should escape the system. In a system where pressure and temperature are being recorded only from the high and low pressure portions, $n^T_A$ may be less than 0, indicating an increase in gaseous fuel leaking into the high pressure portion from the fuel tank.

In another example, the LV may leak or otherwise not form a complete seal. If the FTIV is fully sealable, $n^{TANK}_A$ may be approximately to equal 0 in this example, as no gaseous fuel should move between the fuel tank and the high pressure portion of the fuel system when the FTIV is sealed. The total mass of included gaseous fuel in the entire system ($n^T$) may not change from the first time point to the second time point ($n^T_A=0$ and/or $n^T_{A'}=0$), as no gaseous fuel should be escaping the system. $n^{HP}_A$ may be greater than 0 in this example, indicating a leak out of the high pressure portion of the fuel system. $n^{LP}_A$ may be less than 0 in this example, indicating a leak into the low pressure portion of the fuel system.

The configuration and practical usage of the fuel system may necessitate other controls or subroutines to be introduced to routines 300 and 400 or their equivalents. For example, fill port 37 may be opened over the course of the diurnal cycle. This may be for the purpose of refueling, which may cause the FTIV to open. This may cause the total mass of gaseous fuel in the fuel tank to change, and may also cause the total mass of gaseous fuel in the high-pressure portion of the fuel system to change. The pressure in the fuel tank and high pressure portion of the fuel system may also change. The opening of the fill port may cause the ongoing routine to end. Alternatively, controller 12 may indicate to the user that the routine is ongoing and recommend against opening the fill port. Alternatively, controller 12 may maintain the fill port in a closed configuration until the routine has finished. In another example, the routine may continue, but the data gathered from the fuel tank and high pressure portion may be invalidated. The data gathered from the low pressure portion may be utilized to detect an external leak ($n^{LP}_A$ may be greater than 0) or a fault in the LV ($n^{LP}_A$ may be less than 0).

As shown in FIG. 2, some fuel system configurations may comprise a pressure relief valve (PRV) 64. In one example, controller 12 may maintain the PRV in a closed configuration until the routine has finished. In another example, controller 12 may read the pressure of the low pressure portion of the fuel system as assessed by pressure sensor 102 or another on board sensor and compare the pressure reading to a predetermined threshold. If the pressure is above said threshold, controller 12 may open the PRV prior to taking a first pressure and a first temperature measurement. In yet another example, an opening of the PRV during a routine may cause the routine to end and a mass release indicated.

A leaky or permissive regulator may also affect calculations. As shown in FIG. 1, some fuel system configurations may place regulator 34 downstream of pressure sensor 33 and upstream of LV 36. Gaseous fuel leaking through the regulator during the diurnal cycle may decrease the total mass of gaseous fuel in the high pressure portion of the system, and at constant temperature, may decrease the pressure in the high pressure portion of the system as the gaseous fuel leaks into the portion of the fuel line between regulator 34 and LV 36 ($n^{HP}_A$ may be greater than 0). In this example, although no fuel is leaking out of the system, controller 12 may indicate a minor or gross diurnal leak. Alternatively, the controller may consider the volume of the fuel line between the regulator and the LV, and determine the effect a leaky regulator would have on the total mass contained the high pressure portion. The controller may compare $n^{HP}_A$ to a range of values indicative of a leaky regulator, and indicate a specific fault if $n^{HP}_A$ falls within said range. Alternatively, if gaseous fuel has built up between the regulator and the LV, opening the LV may cause a flux of gaseous fuel into the low pressure portion of the fuel system. Controller 12 may read pressure values as assessed by pressure sensor 102 or another on-board sensor to determine if a pressure change in the low pressure portion of the fuel system falls within a range of values indicative of this event.

As shown in FIG. 2, some fuel system configurations may place regulator 34 downstream of LV 36. Gaseous fuel leaking through the regulator during the diurnal cycle may increase the total mass of gaseous fuel in the low pressure portion of the fuel system, and at constant temperature, may increase the pressure in the low pressure portion as assessed by pressure sensor 102 or another on board sensor ($n^{LP}_A$ may be less than 0). Controller 12 may consider the volume of the fuel line between the LV and the regulator, and determine the effect a leaky regulator would have on the total mass and of the low pressure portion. If no total mass change is assessed in the high pressure portion of the fuel system, controller 12 may indicate a fault in the regulator. An indication of a faulty regulator may lead to controller 12 limiting operation of the vehicle until the vehicle is serviced.

FIGS. 1 and 2 illustrate a fuel system 18 comprising a fuel tank 20 and a pressure sensor 33 that may be coupled to the fuel line downstream of FTIV 32. In this example, the FTIV may need to be opened to obtain a fuel tank pressure reading. Controller 12 may perform a subroutine comprising the steps of opening the FTIV, reading a first fuel tank pressure and first fuel tank temperature, and closing the FTIV. This subroutine may be performed prior to maintaining the closed status of the FTIV and LV, for example prior to 315 of routine 300. In this example, controller 12 may perform another subroutine comprising the steps of opening the FTIV, reading a second fuel tank pressure and second fuel tank temperature, and closing the FTIV. This subroutine may be performed after the completion of the diurnal cycle and the reading of $P^{HP}_{f}$, for example following 350 of routine 300.

While the examples given relate to the fuel systems illustrated by FIGS. 1 and 2, it should be noted that the methods described herein may apply to any fuel system having a high pressure portion in fluid communication with a low pressure portion, the overall method comprising: for each of the high and low pressure portions, generating a first signal that increases with an increasing mass of included fuel as a function of the temperature and pressure of the included fuel at a first instance; then, for each of the high and low pressure portions, generating a second signal that increases with an increasing mass of included fuel as a function of the temperature and pressure of the included fuel at a second instance; next, for each of the high and low pressure portions, generating a third signal that increases with an increasing mass of fuel as a function of the change of mass of included fuel in each portion, the change of mass a function of the signals generated at the first and second instances. The method may further comprise generating a fourth signal that increases with an increasing mass of fuel as a function of the change of mass of included fuel in the system, the change of mass a function of the signals generated at the first and second instances. The method may then entail comparing the generated signals to threshold values for gaseous fuel leaks, for example indicating a fault when the fourth signal is greater than a first threshold.

In another example, degradation of the line valve may be indicated when the third signal for the low pressure system is approximately equal to the negative of the third signal for the high pressure system. In another example, where the third signal for the low pressure system is approximately equal to the fourth signal, the loss of mass from the low pressure portion may be attributed to injector tip leakage. The method may comprise generating a fifth signal that increases with an increase in fuel mass diffusion to the atmosphere over the duration between the first and second instances.

In another example, the generated signals for the fuel system may be used to generate a signal that increases with an increased net mass loss per day. This net mass loss per day signal may be compared to a threshold, and a fault indicated when the signal is greater than said threshold.

If the high pressure volume gains mass, the tank valve has a small internal leak. This may interfere with the ability of the controller to measure relatively small leaks in the high pressure volume.

If the high pressure volume loses mass but the low pressure volume gains mass, this is a leak in the regulator or the line solenoid. This is not a problem unless both the regulator and solenoid valve leaks such that the rail is over-pressurized.

If the high pressure portion of the system loses mass and the low pressure portion of the system shows constant mass, then the high pressure system is leaking to the atmosphere. The most likely leak point is the fill receptacle, but other leaks may also occur If the low pressure portion of the system gains mass and the high pressure portion of the system loses an equivalent mass, the regulator may have an internal leak or the solenoid valve may be leaking. This may be problematic if the leaked volume is significantly increasing the pressure in the fuel rail. If the low pressure portion of the system gains mass and the high pressure portion of the system remains constant, the mass gained by the low pressure portion may be coming from the tank, which may indicate the tank valve, solenoid line valve, and regulator are leaking internally.

A leak from the low pressure portion of the system may be indicative of an external leak, however the gaseous fuel may be retained in the intake manifold for many days. To determine the actual loss to the atmosphere, the controller may apply a low pass filter to the computed diurnal loss to compute the average daily diurnal loss. In a scenario where the fuel rail emptied over the course of a single day into the intake manifold, the peak daily diurnal loss may be only a fraction of that one day's loss.

It will be appreciated that the configurations and routines herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties discussed herein.

The following claims particularly point out certain combinations and subcombinations regarded as novel and nonobvious. The claims may refer to "an" element or "a first" element or the equivalent thereof. Such claims should be understood to include incorporation of one or more such elements, neither requiring nor excluding two or more such elements. Other combinations and sub-combinations of features, functions, elements, and/or properties may be claimed through amendments of the present claims or through presentation of new claims in this or a related application. Such claims, whether broader, narrower or equal, or different in scope to the original claims, also are regarded as included within the subject matter of the present disclosure.

The invention claimed is:

1. A method, comprising:
   for each of a high and a low pressure portion of a fuel system including a gaseous fuel, indicating an external leak based on a loss of mass from the fuel system, the loss of mass based on a change in a total mass including combining separately tracked fuel masses in each of the portions based on respective temperatures and pressures at first and second instances following an engine off condition, and indicating an internal leak based on a comparison of the tracked fuel mass in each of the portions to each other, all valves between a fuel tank of the fuel system and an engine fuel injector of the fuel system being maintained closed during the tracking of each fuel mass, wherein the valves between the fuel tank and the engine fuel injector comprise a fuel tank isolation valve arranged downstream of the fuel tank and upstream of a pressure regulator and a fuel line valve arranged downstream of the pressure regulator and upstream of the engine fuel injector, wherein the high pressure portion of the fuel system is downstream of the fuel tank isolation valve and upstream of the pressure regulator, and wherein the low pressure portion of the fuel system is downstream of the pressure regulator and upstream of the line valve.

2. The method of claim 1, wherein the gaseous fuel is a CNG fuel.

3. The method of claim 2, wherein the engine off condition includes stopping of combustion of the gaseous fuel.

4. The method of claim 1, wherein the engine off condition includes an engine being at rest.

5. The method of claim 1, wherein the engine off condition includes a vehicle off condition.

6. The method of claim 5, wherein the first instance is more than 3 hours following engine shutdown.

7. The method of claim 6, wherein the second instance is more than 24 hours following the first instance.

8. The method of claim 1, wherein the high and low pressure portions of the fuel system are separated by the pressure regulator.

9. The method of claim 1, wherein the low pressure portion of the fuel system is isolated by closing the fuel line valve, and wherein the high pressure portion of the fuel system is isolated by further closing the fuel tank isolation valve.

10. The method of claim 9, wherein the fuel tank isolation valve and the fuel line valve are closed by a controller prior to the first instance, and wherein the fuel tank isolation valve and the fuel line valve are maintained closed by the controller between the first and second instances.

11. The method of claim 1, wherein indicating the internal leak based on the comparison of the tracked fuel mass in each of the portions to each other comprises indicating degradation of the fuel line valve when the tracked fuel mass for the low pressure portion is approximately equal to a negative of the tracked fuel mass for the high pressure portion.

12. A method, comprising:
for each of a fuel tank, a high pressure portion, and a low pressure portion of a fuel system including a gaseous fuel,
indicating an external leak based on a loss of mass from the fuel system, the loss of mass based on a change in a total mass including combining separately tracked fuel masses in each of the fuel tank, the high pressure portion, and the low pressure portion based on respective temperatures and pressures at first and second instances following an engine off condition; and
indicating an internal leak based on a comparison of the tracked fuel mass in each of the fuel tank, the high pressure portion, and the low pressure portion to each other,
wherein all valves between the fuel tank and an engine fuel injector of the fuel system are maintained closed during the tracking of each fuel mass, wherein the valves between the fuel tank and the engine fuel injector comprise a fuel tank isolation valve arranged downstream of the fuel tank and upstream of a pressure regulator and a line valve arranged downstream of the pressure regulator and upstream of the engine fuel injector, wherein the high pressure portion of the fuel system is downstream of the fuel tank isolation valve and upstream of the pressure regulator, and wherein the low pressure portion of the fuel system is downstream of the pressure regulator and upstream of the line valve.

13. The method of claim 12, wherein the valves between the fuel tank and the engine fuel injector comprise the fuel tank isolation valve and the line valve, wherein the fuel tank isolation valve is arranged upstream of the line valve and downstream of the fuel tank, the line valve is arranged upstream of the pressure regulator, and the pressure regulator is arranged upstream of the engine fuel injector.

* * * * *